(12) United States Patent
Wilson

(10) Patent No.: US 8,602,732 B2
(45) Date of Patent: Dec. 10, 2013

(54) WIND TURBINE ROTOR BLADE WITH PASSIVELY MODIFIED TRAILING EDGE COMPONENT

(75) Inventor: Megan M. Wilson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 41 days.

(21) Appl. No.: 13/267,205

(22) Filed: Oct. 6, 2011

(65) Prior Publication Data

US 2012/0141274 A1 Jun. 7, 2012

(51) Int. Cl.
*F03D 1/02* (2006.01)

(52) U.S. Cl.
USPC ............ 416/23; 416/41; 416/132 B; 416/240

(58) Field of Classification Search
USPC ........ 416/23, 24, 41, 117, 118, 132 B, 132 R, 416/147, 240
See application file for complete search history.

(56) References Cited

U.S. PATENT DOCUMENTS

| | | | |
|---|---|---|---|
| 4,082,479 A * | 4/1978 | Rangi et al. ...................... 416/23 |
| 5,181,678 A * | 1/1993 | Widnall et al. ................. 244/219 |
| 5,193,978 A | 3/1993 | Gutierrez |
| 5,320,491 A | 6/1994 | Coleman et al. |
| 5,527,152 A * | 6/1996 | Coleman et al. ................. 416/23 |
| 5,570,859 A | 11/1996 | Quandt |
| 5,895,015 A * | 4/1999 | Saiz ............................... 244/215 |
| 6,015,115 A * | 1/2000 | Dorsett et al. ................. 244/219 |
| 6,164,599 A * | 12/2000 | Piening et al. ................. 244/215 |
| 6,168,379 B1 * | 1/2001 | Bauer .............................. 416/23 |
| 6,199,796 B1 * | 3/2001 | Reinhard et al. ............. 244/35 R |
| 6,769,873 B2 | 8/2004 | Beauchamp et al. |
| 7,059,833 B2 | 6/2006 | Stiesdal et al. |
| 7,632,068 B2 * | 12/2009 | Bak et al. ......................... 416/23 |
| 7,802,759 B2 * | 9/2010 | Ishikawa et al. ......... 244/123.12 |
| 7,922,450 B2 | 4/2011 | Narasimalu |
| 8,419,363 B2 * | 4/2013 | Madsen et al. ................... 416/23 |
| 2006/0145031 A1 * | 7/2006 | Ishikawa et al. .............. 244/219 |
| 2008/0292461 A1 | 11/2008 | Stiesdal |
| 2009/0028704 A1 * | 1/2009 | Rebsdorf et al. ................. 416/23 |
| 2009/0028705 A1 | 1/2009 | Meldgaard et al. |
| 2009/0074573 A1 | 3/2009 | Rebsdorf et al. |
| 2010/0127504 A1 * | 5/2010 | Hancock .......................... 290/55 |
| 2012/0134817 A1 * | 5/2012 | Bagepalli et al. ............... 416/62 |
| 2012/0141269 A1 * | 6/2012 | Giguere et al. .................... 416/1 |
| 2012/0141272 A1 * | 6/2012 | Wilson ............................ 416/23 |
| 2012/0141274 A1 * | 6/2012 | Wilson ............................ 416/44 |

FOREIGN PATENT DOCUMENTS

| | | |
|---|---|---|
| WO | WO 2007079855 A1 * | 7/2007 |
| WO | WO 2008/003330 A1 | 1/2008 |
| WO | WO 2009/061478 A1 | 5/2009 |

* cited by examiner

*Primary Examiner* — Edward Look
*Assistant Examiner* — Christopher R Legendre
(74) *Attorney, Agent, or Firm* — Dority & Manning, P.A.

(57) ABSTRACT

A wind turbine rotor blade includes a root portion and an airfoil portion extending from the root portion and defined by a leading edge and a trailing edge. The airfoil portion further includes a main foil section and a trailing edge section that is pivotally connected to the main foil section along a span-wise extending pivot zone. The trailing edge section is biased to a neutral position wherein the trailing edge section is pivoted chord-wise to a low wind speed position relative to the main foil section.

10 Claims, 5 Drawing Sheets

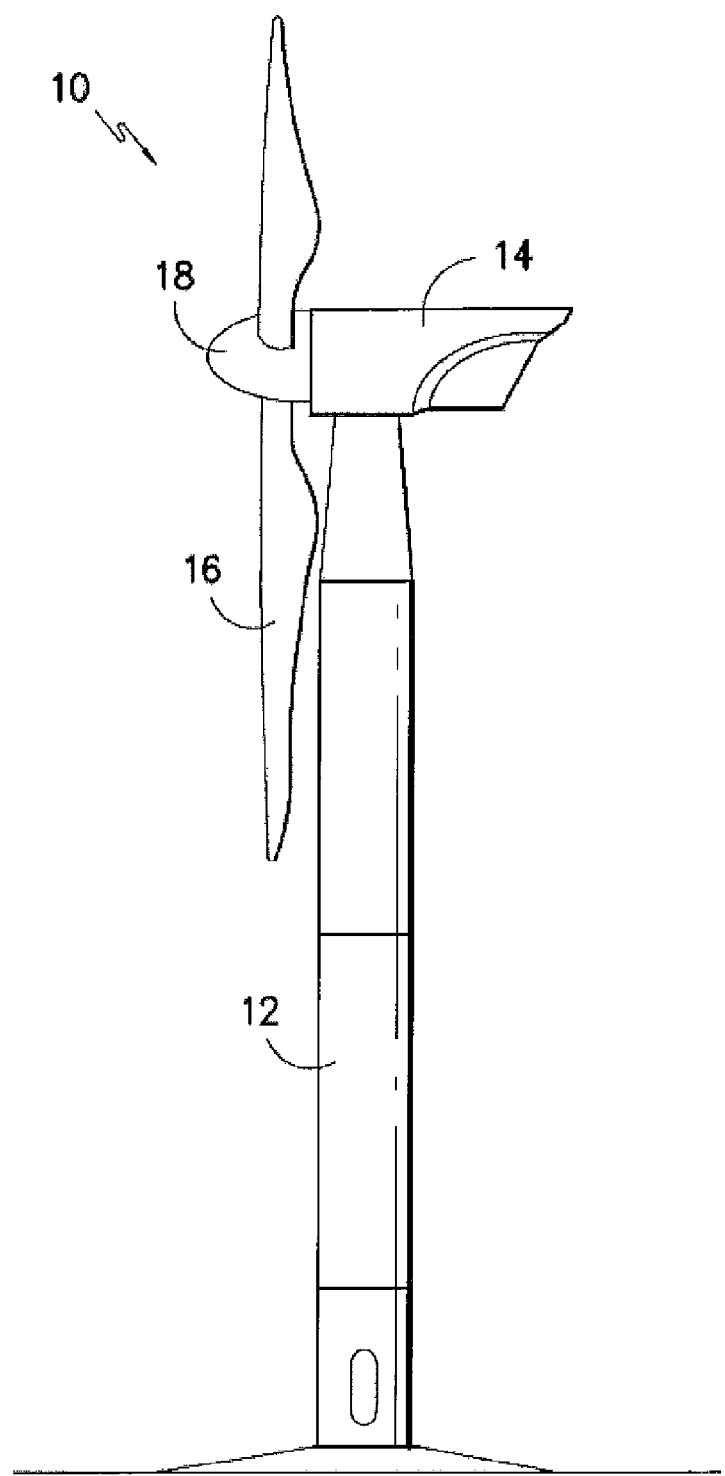
*Fig. -1-*
*Prior Art*

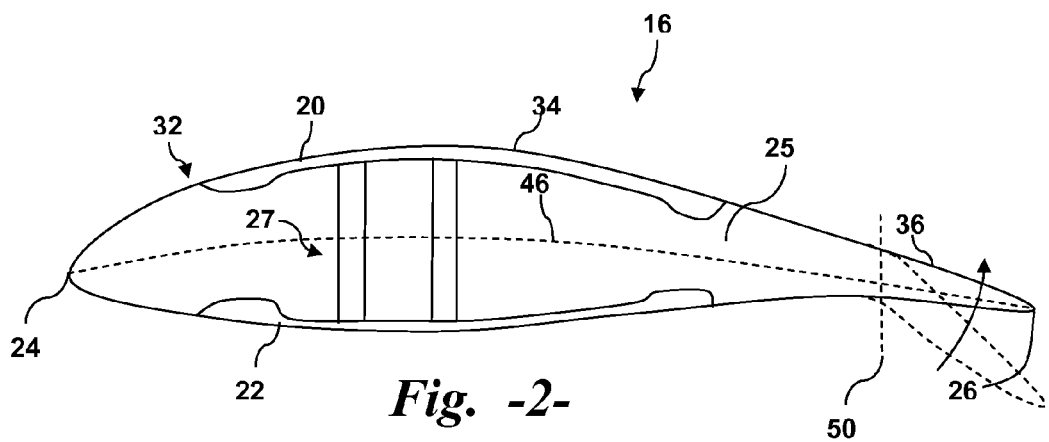
Fig. -2-
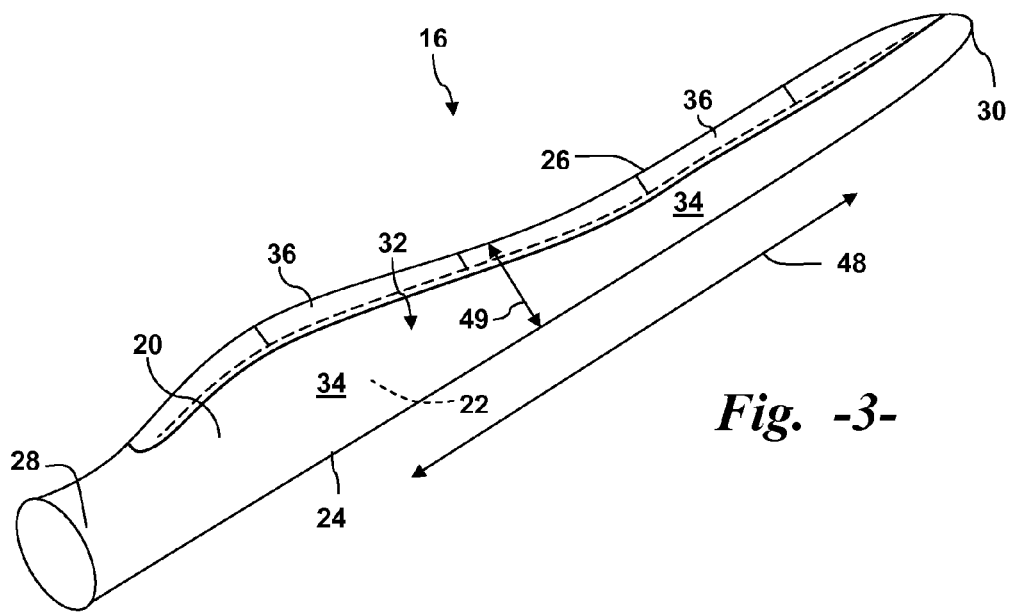
Fig. -3-

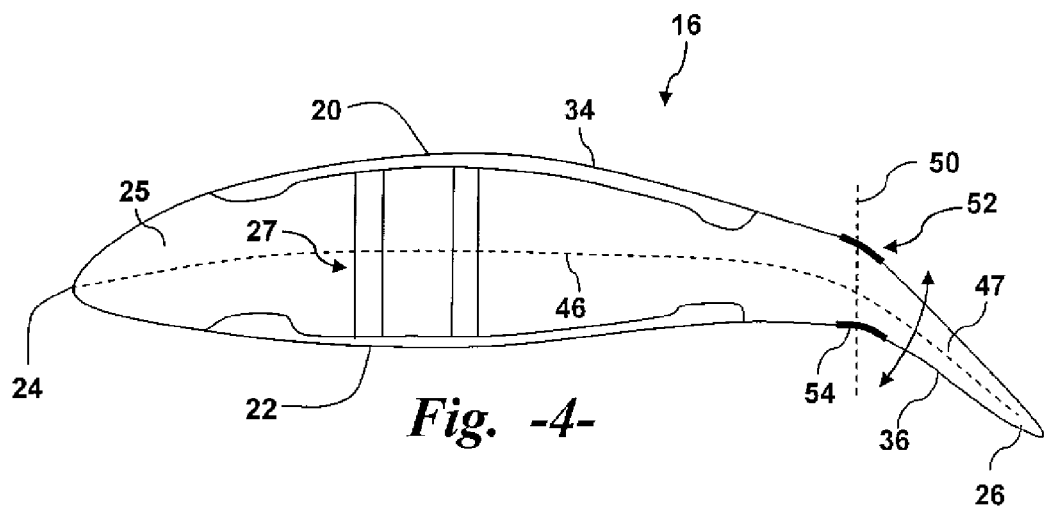
Fig. -4-
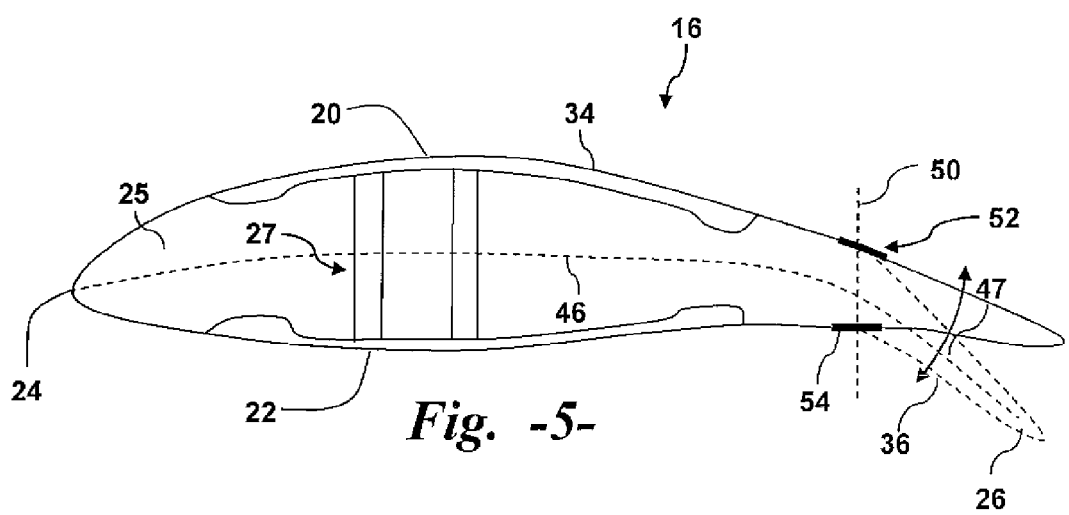
Fig. -5-

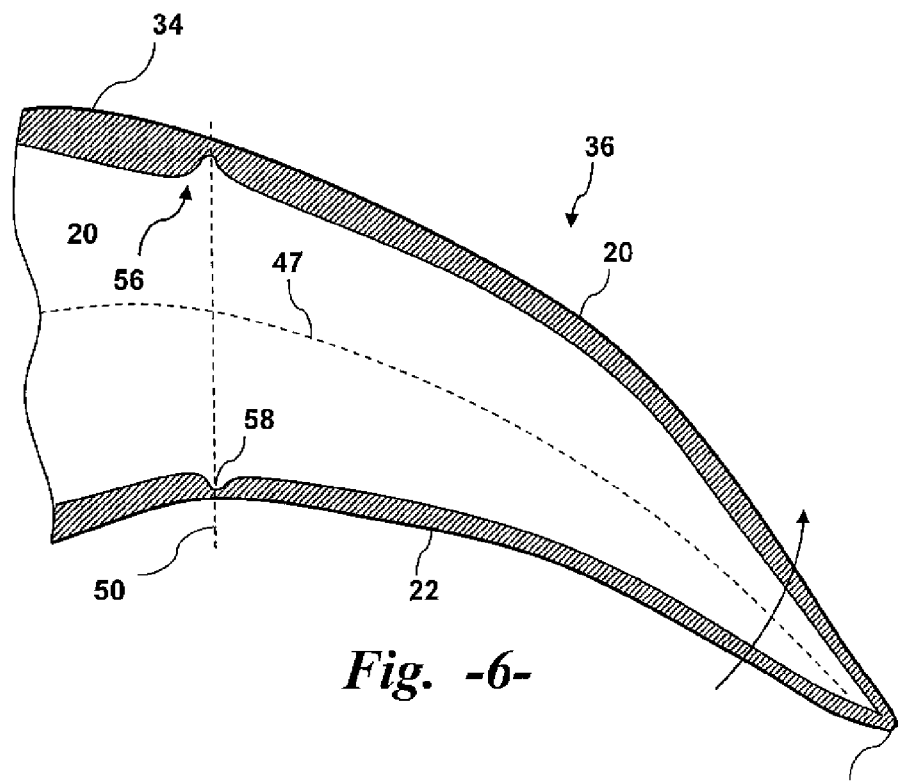
Fig. -6-
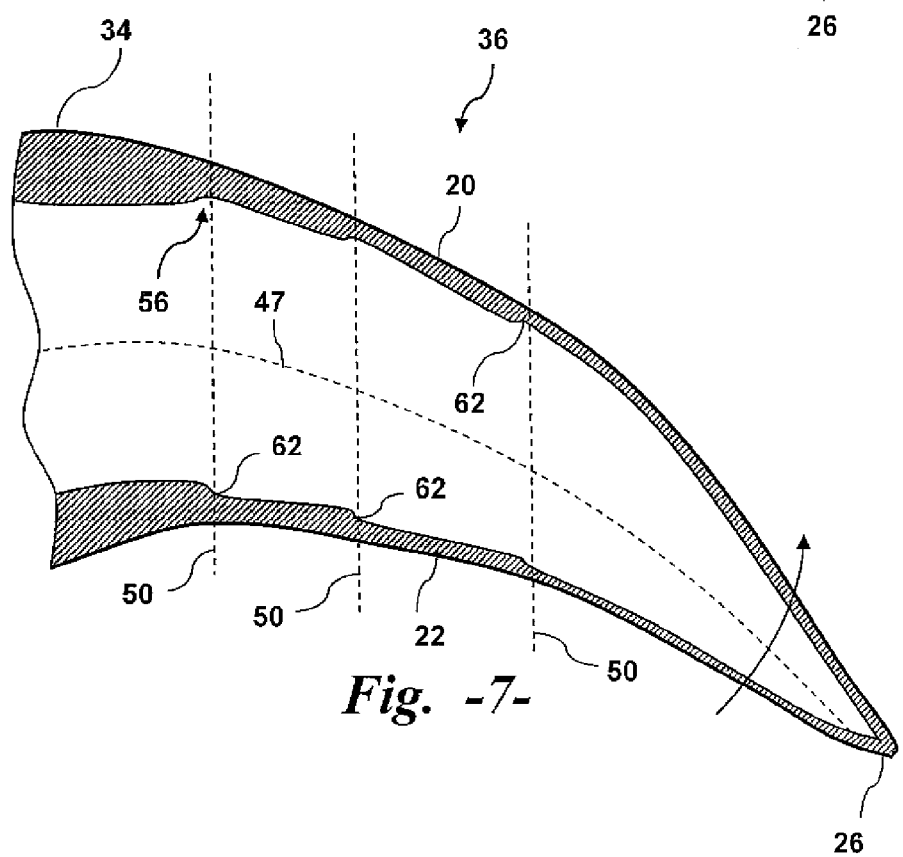
Fig. -7-

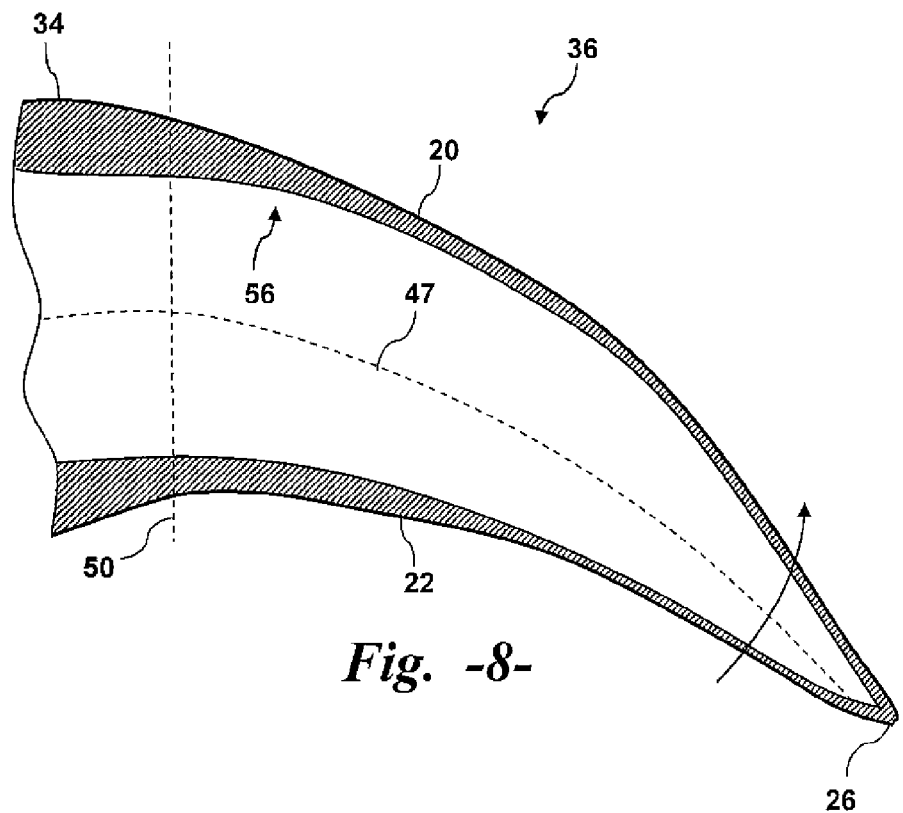
*Fig. -8-*
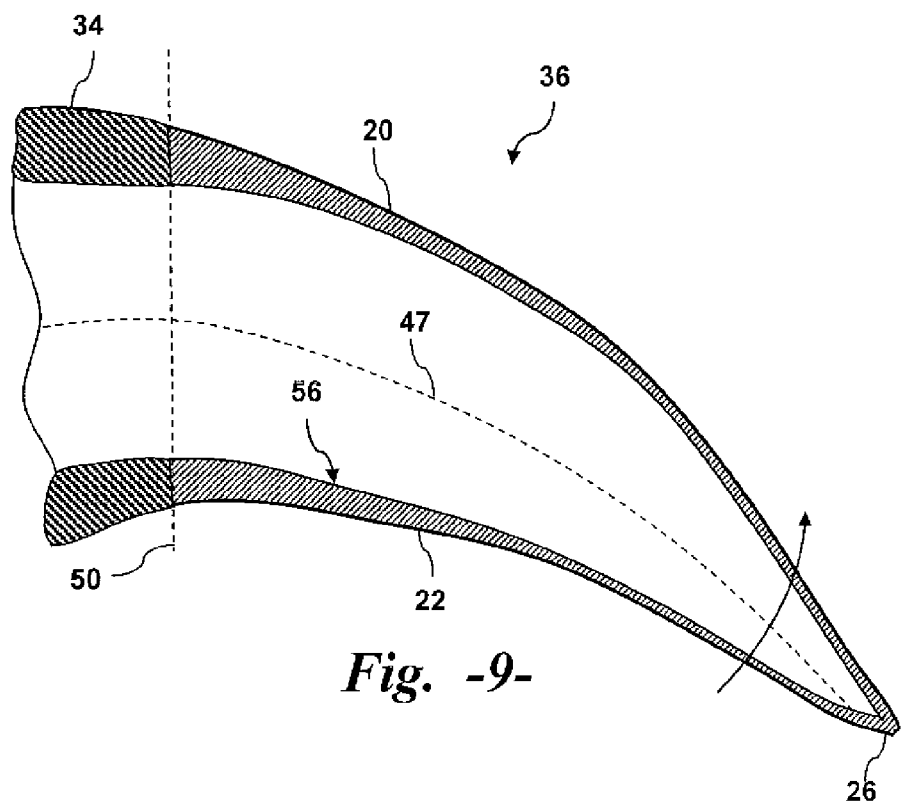
*Fig. -9-*

WIND TURBINE ROTOR BLADE WITH PASSIVELY MODIFIED TRAILING EDGE COMPONENT

FIELD OF THE INVENTION

The present subject matter relates generally to wind turbines, and particularly to wind turbine rotor blades having a passive trailing edge component that reacts and changes position as a function of changing wind conditions.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine blades are generally designed for an optimal wind speed and, thus, are less efficient at other wind speeds. Prior attempts to increase the effective range of wind speeds for the turbine blades have involved active systems that modify or change the aerodynamic profile of the blade by moving or adjusting appendages, flaps, or other control surfaces attached to the blades in an active feedback control loop. Electro-mechanical systems are typically incorporated within the blade for moving the control surfaces. Reference is made for example to U.S. Pat. No. 7,922,450, which describes a blade with a trailing edge section that is moved with an internal piezo-electric actuator in response to aerodynamic loads on the blade.

These systems have also been introduced for load control purposes, wherein the load on the blades is reduced in high wind conditions by changing the aerodynamic profile of the blade via the active control surfaces. Efforts have been made to increase the energy output of wind turbines by increasing the length and surface area of the rotor blades. However, the magnitude of deflection forces and loading of a rotor blade is generally a function of blade length, along with wind speed, turbine operating states, blade stiffness, and other variables. This increased loading not only produces fatigue on the rotor blades and other wind turbine components but may also increase the risk of a sudden catastrophic failure of the rotor blades, for example when excess loading causes deflection of a blade resulting in a tower strike.

Load control is thus a crucial consideration in operation of modern wind turbines. Besides active pitch control systems, it is also known to vary the aerodynamic characteristics of the individual rotor blades as a means of load control, for example with controllable vortex elements, flaps, tabs, and the like configured on the blade surfaces. For example, U.S. Pat. No. 6,972,498 describes various wind turbine blade configurations wherein a retractable extension is provided on a base blade segment to reduce the effective length of the blade in high load conditions. In a particular embodiment, the blade extension is hinged to the base blade segment and jackknifes between a fully extended position and a fully retracted position wherein the blade extension folds into the base blade segment.

Accordingly, the industry would benefit from an improved wind turbine blade design that has an increased effective wind speed range yet avoids the expense and relatively complicated components associated with active enhancement systems.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine rotor blade includes a root portion and an airfoil portion extending from the root portion and defined by a leading edge and a trailing edge of the blade. The airfoil portion further includes a main foil section and a trailing edge section, with the trailing edge section being pivotal relative to the main foil section along a span-wise extending pivot zone. The trailing edge section is biased to a neutral position wherein the trailing edge section is pivoted chord-wise to a low wind speed position relative to the main foil section and is self-actuating from the low wind speed position to an increased wind speed position relative to the main foil section as a function of the biasing force acting on the trailing edge section and wind speed over the airfoil section.

In a particular embodiment, the blade includes a plurality of the pivotal trailing edge sections aligned span-wise along the trailing edge, with each of these trailing edge sections being independently self-actuating. In an alternate embodiment, a single trailing edge section may extend along the blade.

In certain embodiments, the airfoil portion comprises an upper shell member and a lower shell member, with the pivot zone including a flexible resilient material configured with each of the upper and lower shell members. The resilient material provides the biasing force acting on the trailing edge section and enables pivotal movement of the trailing edge section to an increased wind position. In a particular embodiment, the resilient material may be a pre-formed insert member that is incorporated in the upper and lower shell members between the main foil section and the trailing edge section. With this embodiment, the upper and lower shell members may be generally rigid and inflexible from the resilient material to the trailing edge, with the resilient inserts functioning as hinges within each respective shell member.

In still other embodiments, the pivot zone further may include a flexible resilient section of the upper and lower shell members, with this resilient section providing the biasing force acting on the trailing edge section and enabling pivotal movement of the trailing edge section to an increased wind position. This resilient section may be defined for example, by a reduced thickness section of the upper and lower shell members that separates the main foil section from the trailing edge section. The resiliency may be provided by the materials of the shell members alone, or an additional resilient material may be added to the reduced thickness section.

In a further embodiment, the upper and lower shell members may be formed from a flexible resilient material along generally the length of the trailing edge section. For example, the trailing edge section shell members may be separately formed from the main foil section from a different (flexible and resilient) material and coupled to the main foil section to define the trailing edge section of the blade. As a function of the material properties, the trailing edge section may have a reduced rigidity profile from the main foil section to the trailing edge of the blade such that the pivot zone is not a static location, but progressively moves towards the main foil section as wind speed over the blade increases.

The progressively reduced rigidity profile may be accomplished in other ways. For example, the upper and lower shell members have a stepped or tapered decreasing thickness profile along the chord-wise length of the trailing edge section that provides multiple fixed or variable pivot zones along the trailing edge section.

The materials in the pivot zone may be configured such that at a design optimum wind speed for the blade, the trailing edge section is in an in-line position with the main foil section with respect to a chord-wise axis of the blade. The trailing edge section is thus variably positionable anywhere between the low wind speed position and the in-line position.

It should be appreciated that the invention is not limited to any particular size or chord dimension of the trailing edge section, and that such dimensions may vary from the root to the tip of the blade, or between different trailing edge sections. In certain embodiments, the main foil section extends at least 50% of the blade chord (taken from the leading edge towards the trailing edge) along the span of the blade. Thus, in this embodiment, the trailing edge section of the blade is less than 50% of the blade chord.

The present invention also encompasses any manner of wind turbine configuration having one or more rotor blades configured with a trailing edge extension as set forth herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a cross-sectional view of an embodiment of a wind turbine rotor blade in accordance with aspects of the invention;

FIG. 3 is a perspective view of an embodiment of a wind turbine rotor blade in accordance with aspects of the invention;

FIG. 4 is a cross-sectional view of an embodiment of a wind turbine rotor blade incorporating a passively actuated trailing edge section;

FIG. 5 is a cross-sectional view of an alternative embodiment of a wind turbine rotor blade incorporating a passively actuated trailing edge section; and FIG. 6 is a cross-sectional view of an embodiment of a trailing edge section in accordance with aspects of the invention;

FIG. 7 is a cross-sectional view of a different embodiment of a trailing edge section;

FIG. 8 is a cross-sectional view of still another embodiment of a trailing edge section; and FIG. 9 is a cross-sectional view of yet another embodiment of a trailing edge section.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12 supported on a base foundation, a nacelle 14 mounted on the tower 12, and a rotor hub 18 that is coupled to power-generating equipment contained within the nacelle 14. The rotor 18 includes rotor blades 16 coupled to and extending radially outward from the hub 20, for example three rotor blades 16 as depicted in the figure. However, in an alternative embodiment, the rotor 18 may include more or less than three rotor blades 16.

Referring to FIG. 2, each of the wind turbine blades 16 includes an upper shell member 20 and a lower shell member 22, with an internal cavity 25 defined between the shell members. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at respective bond lines along the leading edge 24 and trailing edge 26. Any manner of internal structural members 27, such as a shear web, spar caps, and the like, may also be provided.

The rotor blades 16 may generally have any suitable length that enables the wind turbine 10 to function according to design criteria. For example, the rotor blades 16 may have a length ranging from about 9 meters (m) to about 100 m. The rotor blades 16 are spaced about the hub 18 to facilitate transfer of kinetic energy from the wind into usable mechanical energy, and subsequently, electrical energy. Specifically, the hub 18 may be coupled to an electric generator (not illustrated) disposed within the nacelle 14 for production of electrical energy. Further, the rotor blades 16 are mated to the hub 18 by coupling the blade root portion 28 to the hub 18 at a plurality of load transfer regions. Thus, any loads induced to the rotor blades 16 are transferred to the hub 18 via the load transfer regions.

Referring to FIGS. 2 and 3, an embodiment of a wind turbine rotor blade 16 includes an airfoil portion 32 that extends from the root 28 to the blade tip 30. The airfoil portion 32 is defined by the upper 20 and lower 22 shell members between the leading edge 24 and trailing edge 26. The airfoil section 32 is divided into a main foil section 34 and a trailing edge section 36. A pivot zone 50 delineates the main foil section 34 from the trailing edge section 36. Thus, the trailing edge section 36 may be defined as the portion of the airfoil 32 that extends from the trailing edge 26 to the pivot zone 50. The trailing edge section 36 is pivotal relative to the main foil section 34 along the span-wise extending pivot zone 50 (with the span-wise direction indicated by the arrow 48 in FIG. 3).

Referring to FIG. 2, the trailing edge section 36 is biased to a neutral position indicated by the dashed lines (solid lines in FIG. 4) wherein the trailing edge section 36 is pivoted chord-wise to a low wind speed position relative to the main foil section 34 (with the chord-wise direction indicated by the arrow 49 in FIG. 3). Referring to FIG. 4, the blade 16 has a chord axis 46. In the neutral position of the trailing edge section 36, the axis 47 of the trailing edge section 36 is angled or pivoted towards the lower shell member 22 (which may be considered as the pressure side of the blade 16). Thus, the trailing edge section 36 is pivoted in a chord-wise direction relative to the main foil section 34.

The neutral position of the trailing edge section 36 in FIG. 4 corresponds to a low wind speed position of the trailing edge section 36 wherein the aerodynamic profile of the blade 16 is modified from the profile that the blade is designed for at an optimum wind speed (FIG. 2) in order to better capture wind energy at lower wind speeds. From this neutral low wind speed position, the trailing edge section 36 self-actuates to an increased wind position relative to the main foil section 34 against the biasing force acting on the section 36 as a function of wind speed. As wind speed (and load) on the blade 16 increases, so does the pivotal position of the trailing edge section 36 relative to the main foil section 34.

FIG. 5 depicts an embodiment of the wind turbine blade 16 wherein the trailing edge section 36 is pivoted to an increased wind speed position (in solid lines) relative to the main foil section 34. In this position, the axis 47 of the trailing edge section 36 is aligned with the axis 46 of the main foil section 34. This position of the trailing edge section 36 may correspond to an overall aerodynamic profile of the wind turbine blade 16 that is designed for an optimum wind speed. It should be appreciated that the increased wind speed position of the trailing edge section 36 can correspond to any position of the section 36 between the neutral position depicted in FIG. 4 and the optimum wind speed position depicted in FIG. 5 as a function of wind speed.

In certain embodiments depicted in FIGS. 4 and 5, the airfoil portion comprises an upper shell member 20 and a lower shell member 22, with the pivot zone 50 including a flexible resilient material 52 configured with each of the upper and lower shell members. The resilient material 52 provides the biasing force acting on the trailing edge section 36 and enables pivotal movement of the trailing edge section 36 to an increased wind position. In a particular embodiment, the resilient material 52 may be a pre-formed insert member 54 that is incorporated in the upper and lower shell members 20, 22 between the main foil section 34 and the trailing edge section 36. With this embodiment, the upper and lower shell members 20, 22 may be generally rigid and inflexible from the resilient material 52 to the trailing edge 26, with the resilient inserts 54 functioning as hinges within each respective shell member.

In still other embodiments depicted in FIGS. 6 and 7, the pivot zone 50 further may include a flexible resilient section 56 of the upper and lower shell members 20, 22, with this resilient section 56 providing the biasing force acting on the trailing edge section 36 and enabling pivotal movement of the trailing edge section 36 to an increased wind position. This resilient section 56 may be defined for example, by a reduced thickness section 58 of the upper and lower shell members 20, 22 that separates the main foil section 34 from the trailing edge section 36. The resiliency may be provided by the materials of the shell members alone, or an additional resilient material may be added to the reduced thickness section.

In a further embodiment depicted in FIGS. 8 and 9, the upper and lower shell members 20, 22 may be formed from a flexible resilient material along generally the length of the trailing edge section 36. For example, the trailing edge section shell members 36 may be separately formed from the main foil section 34 from a different (flexible and resilient) material and coupled to the main foil section 34 to define the trailing edge section 36 of the blade (FIG. 9). As a function of the material properties, the trailing edge section 36 may have a reduced rigidity profile (FIG. 8) from the main foil section 34 to the trailing edge 26 of the blade such that the pivot zone 50 is not a static location, but progressively moves towards the main foil section 34 as wind speed over the blade increases.

The progressively reduced rigidity profile may be accomplished in other ways. For example, the upper and lower shell members 20, 22 may have a stepped or tapered decreasing thickness profile 62 (FIG. 7) along the chord-wise length of the trailing edge section 36 that provides multiple fixed or variable pivot zones 50 along the trailing edge section 36.

The materials in the pivot zone 50 may be configured such that at a design optimum wind speed for the blade, the trailing edge section 36 is in an in-line position with the main foil section 34 with respect to a chord-wise axis 46 (FIG. 5) of the blade. The trailing edge section 36 is thus variably positionable anywhere between the low wind speed position and the in-line position.

It should be appreciated that the invention is not limited to any particular size or chord dimension of the trailing edge section 36, and that such dimensions may vary from the root to the tip of the blade, or between different trailing edge sections. In certain embodiments, the main foil section 34 extends at least 50% of the blade chord (taken from the leading edge towards the trailing edge) along the span of the blade. Thus, in this embodiment, the trailing edge section 36 of the blade is less than 50% of the blade chord.

It should also be appreciated that the present invention encompasses any manner or configuration of a wind turbine that incorporates one or more rotor blades with a passively actuated trailing edge section as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
a root portion;
an airfoil portion extending from said root portion and defined by a leading edge and a trailing edge;
said airfoil portion further comprising a main foil section and a trailing edge section, said trailing edge section pivotal relative to said main foil section along a span-wise extending pivot zone;
said trailing edge section biased to a neutral position wherein said trailing edge section is pivoted chord-wise to a low wind speed position relative to said main foil section;
said trailing edge section being self-actuating from said low wind speed position to an increased wind speed position relative to said main foil section as a function of the biasing force acting on said trailing edge section and wind speed over said airfoil section; and
said trailing edge section comprising a generally rigid and chord-wise inflexible upper shell member and lower shell member, said pivot zone further comprising a resilient material section configured between each of said upper and lower shell members of said trailing edge section and said main foil section, said resilient material section providing the biasing force acting on said trailing edge section and enabling pivotal movement of said trailing edge section to an increased wind position.

2. The wind turbine blade as in claim 1, comprising a plurality of said pivotally connected trailing edge sections aligned span-wise along said trailing edge, each of said trailing edge sections independently self-actuating from said low wind speed position to an increased wind speed position.

3. The wind turbine blade as in claim 1, wherein said resilient material section comprises an insert member in each of said upper and lower shell members between said main foil section and said trailing edge section.

4. The wind turbine blade as in claim 1, wherein said resilient material section comprises a reduced thickness section between each of said upper and lower shell members and said main foil section.

5. The wind turbine blade as in claim 1, wherein said trailing edge section is pivotal to a maximum increased wind speed position that corresponds to an in-line position with said main foil section with respect to a chord-wise axis of said blade at a design optimum wind speed.

6. The wind turbine blade as in claim 1, wherein said main foil section extends at least 50% of the blade chord taken from said leading edge along the span of said blade.

7. A wind turbine, comprising:
a plurality of rotor blades, each said rotor blade further comprising:
 a root portion connected to a rotor hub and an airfoil portion extending radially outward from said root portion and defined by a leading edge and a trailing edge;
 said airfoil portion further comprising a main foil section and a trailing edge section, said trailing edge section pivotal relative to said main foil section along a span-wise extending pivot zone;
 said trailing edge section biased to a neutral position wherein said trailing edge section is pivoted chord-wise to a low wind speed position relative to said main foil section;
 said trailing edge section being self-actuating from said low wind speed position to an increased wind speed position relative to said main foil section as a function of the biasing force acting on said trailing edge section and wind speed over said airfoil section; and
 said trailing edge section comprising a generally rigid and chord-wise inflexible upper shell member and lower shell member, said pivot zone further comprising a resilient material section configured between each of said upper and lower shell members of said trailing edge section and said main foil section, said resilient material section providing the biasing force acting on said trailing edge section and enabling pivotal movement of said trailing edge section to an increased wind position.

8. The wind turbine as in claim 7, comprising a plurality of said pivotally connected trailing edge sections aligned span-wise along said trailing edge, each of said trailing edge sections independently self-actuating from said low wind speed position to an increased wind speed position.

9. The wind turbine as in claim 7, wherein said resilient material section comprises an insert member in each of said upper and lower shell members between said main foil section and said trailing edge section.

10. The wind turbine as in claim 7, wherein said resilient material section comprises a reduced thickness section between each of said upper and lower shell members of said trailing edge section and said main foil section.

* * * * *